(12) United States Patent
Liu et al.

(10) Patent No.: US 11,586,992 B2
(45) Date of Patent: Feb. 21, 2023

(54) TRAVEL PLAN RECOMMENDATION METHOD, APPARATUS, DEVICE AND COMPUTER READABLE STORAGE MEDIUM

(71) Applicant: BAIDU ONLINE NETWORK TECHNOLOGY (BEIJING) CO., LTD., Beijing (CN)

(72) Inventors: Hao Liu, Beijing (CN); Panpan Zhang, Beijing (CN); Jianguo Duan, Beijing (CN); Hui Xiong, Beijing (CN)

(73) Assignee: BAIDU ONLINE NETWORK TECHNOLOGY (BEIJING) CO., LTD.

(*) Notice: Subject to any disclaimer, the term of this patent is extended or adjusted under 35 U.S.C. 154(b) by 641 days.

(21) Appl. No.: 16/674,030

(22) Filed: Nov. 5, 2019

(65) Prior Publication Data
US 2020/0226502 A1 Jul. 16, 2020

(30) Foreign Application Priority Data
Jan. 16, 2019 (CN) .......................... 201910040578.2

(51) Int. Cl.
*G06Q 10/02* (2012.01)
*G06N 20/00* (2019.01)
*G06Q 50/30* (2012.01)

(52) U.S. Cl.
CPC ........... *G06Q 10/025* (2013.01); *G06N 20/00* (2019.01); *G06Q 50/30* (2013.01)

(58) Field of Classification Search
CPC ............................. G06Q 10/025; G06Q 50/30
See application file for complete search history.

(56) References Cited

U.S. PATENT DOCUMENTS

2017/0023370 A1 1/2017 Delaney et al.
2017/0345108 A1* 11/2017 Bakshiram ........... G06Q 20/389
(Continued)

FOREIGN PATENT DOCUMENTS

CN 102378986 A 3/2012
CN 102645220 A 8/2012
(Continued)

OTHER PUBLICATIONS

Lin Wan, A hybrid ensemble learning method for tourist route recommendations based on geo-tagged social networks, May 3, 2018, International Journal of Geographical Information Science (Year: 2018).*

(Continued)

*Primary Examiner* — Resha Desai
*Assistant Examiner* — Ismail A Manejwala
(74) *Attorney, Agent, or Firm* — Dilworth IP, LLC

(57) ABSTRACT

Embodiments of the present disclosure provide a travel plan recommendation method, an apparatus, a device and a computer readable storage medium. In the method according to the embodiments of the present disclosure, the travel plan classification model is obtained by training with the comprehensive consideration of the diversity of users, the diversity of the travel environment in time and space and dynamics of the user's travel preference, and the travel feature vector is generated according to the user persona information and the travel mode distribution information of the user, the current travel environment feature information and the feature information of the starting point and the destination point of the current travel, the travel feature vector is inputted into the travel plan classification model to calculate the scores of the candidate travel plans, and the travel plan recommended to the user according to the scores of the candidate travel plans.

19 Claims, 7 Drawing Sheets

(56) References Cited

U.S. PATENT DOCUMENTS

2018/0017405 A1* 1/2018 Chen ................ G06F 16/29
2018/0276573 A1* 9/2018 Otillar ............... G06Q 10/02
2020/0051196 A1* 2/2020 Miao ................ G06V 40/20

FOREIGN PATENT DOCUMENTS

| CN | 103678489 A | 3/2014 |
|---|---|---|
| CN | 106156084 A | 11/2016 |
| CN | 107289958 A | 10/2017 |
| CN | 108072380 A | 5/2018 |
| CN | 108629457 A | 10/2018 |

OTHER PUBLICATIONS

Wang, Li et al., A Product Normalization Method for E-Commerce, China Academic Journal Electronic Publishing House, Chinese Journal of Computers, vol. 37, No. 2, Feb. 2014, pp. 312-325.
Jiang, Zhou et al., An Optimization Model of Public Transportation Routes considering Public-sponsored Bicycles, China Academic Journal Electronic Publishing House, 2015, pp. 53-59.
First Office Action in CN Patent Application No. 201910040578.2 dated Jul. 1, 2021.

\* cited by examiner

TRAVEL PLAN RECOMMENDATION METHOD, APPARATUS, DEVICE AND COMPUTER READABLE STORAGE MEDIUM

CROSS-REFERENCE TO RELATED APPLICATION

This application claims priority to Chinese Patent Application No. 201910040578.2 filed on Jan. 16, 2019, which is hereby incorporated by reference in its entirety.

TECHNICAL FIELD

Embodiments of the present disclosure relate to the field of information recommendation technologies, and in particular, to a travel plan recommendation method, an apparatus, a device and a computer readable storage medium.

BACKGROUND

With the continuous development of the electronic map technology, people become more and more dependent upon the navigation function of the electronic map, a client of the electronic map can recommend various travel plans for a user based on a starting point and a destination point provided by the user, such as various travel plans for different trip modes.

Currently, in the recommendation of a travel plan to the user, generally, the "fastest" travel plan is recommended to the user according to total durations of the travel plans, or the travel plan with the "lowest cost" is recommended according to total costs of the travel plans. However, due to the diversity of users and travel environments, existing travel plan recommendation methods have low recommendation accuracy and poor stability, thus they cannot meet user requirements.

SUMMARY

Embodiments of the present disclosure provide a travel plan recommendation method, an apparatus, a device and a computer readable storage medium, which are used to solve the problem that the recommendation method of the existing travel plan is unable to meet user requirements due to its low recommendation accuracy and poor stability.

An aspect of the embodiment of the present disclosure provides a travel plan recommendation method, including:

generating a travel feature vector, according to user persona information and travel mode distribution information of a user, current travel environment feature information, and feature information of a starting point and a destination point of a current travel;

inputting the travel feature vector into a travel plan classification model to calculate scores of candidate travel plans, where the travel plan classification model is obtained by training using a training set; and recommending a travel plan to the user according to the scores of the candidate travel plans.

Another aspect of the embodiments of the present disclosure provides a travel plan recommendation apparatus, including:

a feature extraction module, configured to generate a travel feature vector, according to user persona information and travel mode distribution information of a user, current travel environment feature information, and feature information of a starting point and a destination point of a current travel;

a recommendation processing module, configured to input the travel feature vector into a travel plan classification model to calculate scores of candidate travel plans, where the travel plan classification model is obtained by training using a training set;

the recommendation processing module is further configured to recommend a travel plan to the user according to the scores of the candidate travel plans.

Another aspect of the embodiments of the present disclosure provides a travel plan recommendation device, including:

a memory, a processor, and a computer program that is stored on the memory and executable on the processor, where the processor, when executing the computer program, implements the method described above.

Another aspect of the embodiments of the present disclosure provides a computer readable storage medium having a computer program stored thereon, where the processor, when executing the computer program, implements the method described above.

According to the travel plan recommendation method, the apparatus, the device and the computer readable storage medium according to the embodiments of the present disclosure. the travel plan classification model is obtained by training with the comprehensive consideration of the diversity of users, the diversity of the travel environment in time and space and dynamics of the users travel preference, and the travel feature vector is generated according to the user persona information and the travel mode distribution information of the user, the current travel environment feature information and the feature information of the starting point and the destination point of the current travel, the travel feature vector is inputted into the travel plan classification model to calculate the scores of the candidate travel plans, and the travel plan recommended to the user according to the scores of the candidate travel plans, which improves the accuracy and stability of the travel plan recommendation, and makes the travel plan recommendation more accurate and effective.

Figure 1:
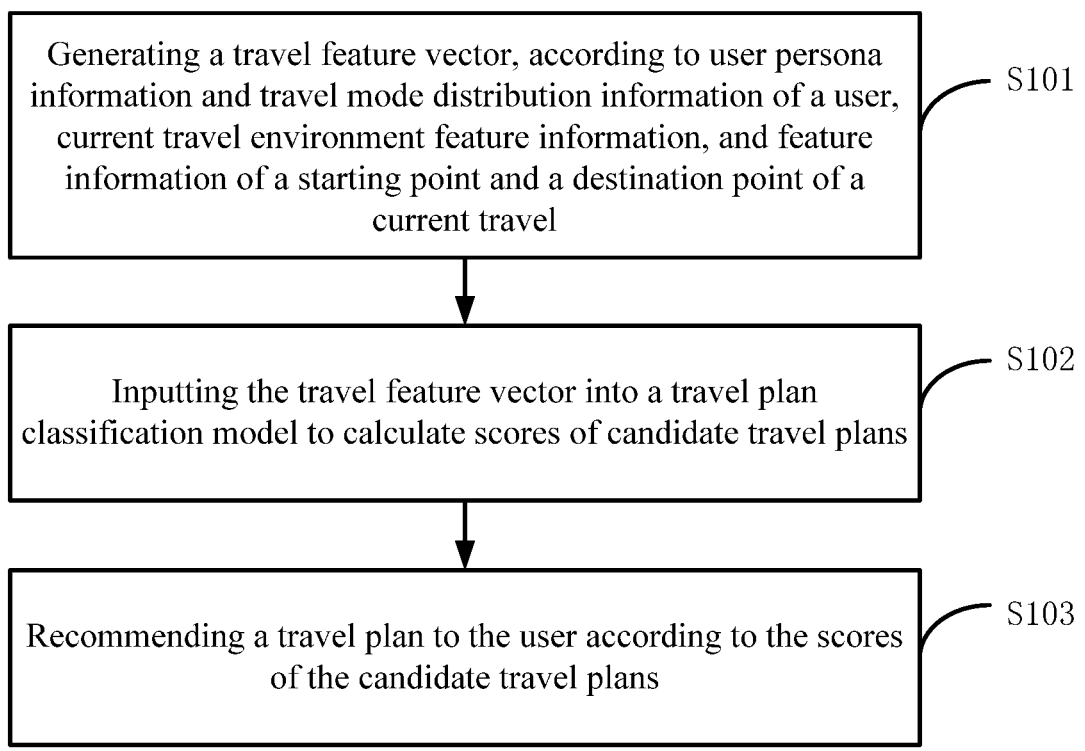
FIG. 1 is a flowchart of a travel plan recommendation method according to Embodiment I of the present disclosure.

Specific embodiments of the present disclosure are illustrated through the above-mentioned drawings, and a more detailed description thereof will be described later. The drawings and description are not intended, by any means, to limit the scope of the conception of the embodiments of the present disclosure, instead, they are intended to illustrate the concepts of the present disclosure for those skilled in the art by referring to the specific embodiments.

DETAILED DESCRIPTION OF THE EMBODIMENTS

Exemplary embodiments will be described in detail herein, examples of which are illustrated in the drawings. Unless otherwise indicated, same numerals in different drawings indicate the same or similar elements, when the drawings are referred to in the following description. Implementations described in the following exemplary embodiments do not represent all implementations consistent with embodiments of the disclosure. Instead, they are merely examples of apparatuses and methods consistent with some aspects of the embodiments of the disclosure as detailed in the appended claims.

The terms "first", "second", and the like, which are referred to in the embodiments of the present disclosure, are only used for the purpose of description, and they cannot be construed as indicating or implying a relative importance or implicitly indicating the number of technical features indicated. In the following description of the respective embodiments, the meaning of "a plurality of" is two or more, unless specifically defined otherwise.

The following specific embodiments may be combined with each other, and the same or similar concepts or processes may not be repeated in some embodiments. Embodiments of the present disclosure will be described below with reference to the drawings.

Embodiment I

FIG. 1 is a flowchart of a travel plan recommendation method according to Embodiment I of the present disclosure. To the problem that the existing travel plan recommendation methods cannot meet the user requirements due to their low recommendation accuracy and poor stability, this embodiment of the present disclosure provides a travel plan recommendation method.

The method in this embodiment is applied to a travel plan recommendation device, and the travel plan recommendation device may be a terminal device which may be a mobile terminal having an electronic map client running thereon, such as a smartphone, a tablet computer and an AR device, or the travel plan recommendation device may also be a server. In other embodiments, this method may also be applicable to other devices. In this embodiment, the terminal device is taken as an example for illustration. As shown in FIG. 1, the specific steps of the method are as follows:

Step S101: generating a travel feature vector, according to user persona information and travel mode distribution information of a user, current travel environment feature information, and feature information of a starting point and a destination point of a current travel.

An application scenario of this embodiment is: the terminal device receives a travel plan query request (such as a navigation request) entered by the user, and the travel plan query request includes at least a user identifier (such as a user ID) of the user, the starting point and the destination point. According to the travel plan query request of the user, the terminal device first acquires feature data of the current travel: the user persona information and the travel mode distribution information of the user, the current travel environment feature information, and the feature information of the starting point and the destination of the current travel, and then the terminal device generates the travel feature vector according to the feature data of the current travel.

Different users may have different travel preferences due to the diversity of users. For example, for users with lower income levels and consumption levels, they may prefer travel plans using travel modes such as walking, cycling and public transportation compared with travel plans using the travel mode of taking a taxi, and married people may prefer to travel by car because they probably have private cars.

In this embodiment, the user persona information is taken as an important factor affecting the user's choice of the travel plan, and users with similar persona information may have similar travel preferences.

The user persona information may include: gender, age, occupation, education level, income level, consumption level, marital status and so on.

The preference information of the user usually changes over time instead of being invariable, thus in this embodiment, the travel mode distribution information of the user is taken as an important factor affecting the user's choice of the travel plan. In addition to modeling the dynamic preference of the user that naturally changes over time, it is also a complement to the user persona and environmental feature information. For example, in the user persona information, a user who doesn't own a car is mistakenly recorded as a car owner, and this kind of error can be corrected through the recent travel mode distribution information; in another aspect, as the weather turns cold, the number of times the user chooses to walk will be significantly higher than to ride, this kind of distribution features may also compensate for the lack or inaccuracy of environmental features to a certain extent.

The travel mode distribution information may be the travel mode distribution information of the user in a recent period of time, which may specifically include the number of travel times in respective travel modes and the proportion of the number of travel times in the respective travel modes. For example, the travel mode distribution information may include: the number of times of walking, the number of times of riding, the number of times of taking a bus, the number of times of driving, the number of times of taking a taxi, the proportion of walking, the proportion of riding, the proportion of taking a bus, the proportion of driving, the proportion of taking a taxi.

Considering that the starting points and the destination points of the travels are highly diverse, the users has higher preference in certain travel modes at the starting points and the destination points with certain features. For example, for a starting point and a destination point that are very close to each other, walking is usually suitable; for a starting point and a destination point having more developed public transportation facilities (such as subway stations) around, a travel plan using the public transportation (taking the subway) may be more advantageous.

In this embodiment, the feature information of the starting point and the destination point is taken as an important factor affecting the users choice of the travel plan, and for similar starting points and destination points, the user may have similar travel preferences.

The feature information of the starting point and the destination point of the current travel may specifically include: a distance between the starting point and the destination point (for example, a straight line distance between the starting point and the destination point calculated according to coordinates of the starting point and the destination point), the number of bus stops within a preset range around the starting point, the number of bus stops within a preset range around the destination point, the number of shared bicycles within a preset range around the starting point, the number of shared bicycles within a preset range around the destination point, the number of subway stations within a preset range around the starting point, the number of subway stations within a preset range around the destination point, and so on.

The preset range(s) may be set by a skilled person according to actual needs, and the preset range(s) is used to define a certain range around the starting point or the destination point, which is not specifically limited in this embodiment.

In addition, the selections of travel plans by the user in different environments generally are greatly different. For example, the accessibility of public transportation is very poor at night, so the user mostly chooses to travel by taxi, and in bad weather such as rain and snow, the user is more likely to walk or take public transportation instead of riding. In this embodiment, the travel environment feature information is taken as an important factor affecting the user's choice of the travel plan.

The current travel environment feature information may include: whether it is a weekend, whether it is a statutory holiday, a weather condition, air quality, temperature, and so on. The weather condition may include: whether it is sunny, an ultraviolet index, whether it rains, a rainfall level, whether it snows, a snowfall level, whether it is foggy, a fog level, whether it is windy, a wind level, and so on.

After the feature data of the current travel is acquired, the feature data of the current travel may be spliced into a complete vector to obtain the travel feature vector.

Optionally, after the feature data of the current travel is acquired, the terminal device may perform feature preprocessing on the feature data of the current travel according to a preset feature pre-processing rule, and then splice the feature data that is feature pre-processed into a vector to obtain the travel feature vector.

Step S102: inputting the travel feature vector into a travel plan classification model to calculate scores of candidate travel plans.

The candidate travel plans, determined by the terminal device according to the starting point and the destination point, are feasible travel plans through which the destination point can be reached starting from the starting point. Each pair of the starting point and the destination point corresponds to multiple candidate travel plans.

In this embodiment, based on the machine learning technology, a training set is used to train a preset classification model in advance, so as to obtain the travel plan classification model. For the specific implementation, reference may be made to the detailed description in Embodiment II. After the travel plan classification model is obtained by training, the travel plan classification model is made persistent for invocation by online services.

For example, the travel plan classification model may be a multi-type xgboost classifier which is configured to output the scores of respective candidate travel plans according to the inputted travel feature vector.

After the travel feature vector of the current travel is obtained, the terminal device invokes the travel plan classification model in the step, inputs the travel feature vector into the travel plan classification model to calculate the scores of respective candidate travel plans through the travel plan classification model.

Step S103: recommending a travel plan to the user according to the scores of the candidate travel plans.

After the scores of the respective candidate travel plans are calculated, one or more candidate travel plans with the highest score is recommended to the user according to the order of the scores from high to low.

In this embodiment of the present disclosure, the travel plan classification model is obtained by training with the comprehensive consideration of the diversity of users, the diversity of the travel environment in time and space and dynamics of the user's travel preference, and the travel feature vector is generated according to the user persona information and the travel mode distribution information of the user, the current travel environment feature information and the feature information of the starting point and the destination point of the current travel, the travel feature vector is inputted into the travel plan classification model to calculate the scores of the candidate travel plans, and the travel plan recommended to the user according to the scores of the candidate travel plans, which improves the accuracy and stability of the travel plan recommendation, and makes the travel plan recommendation more accurate and effective.

Embodiment II

Figure 2:
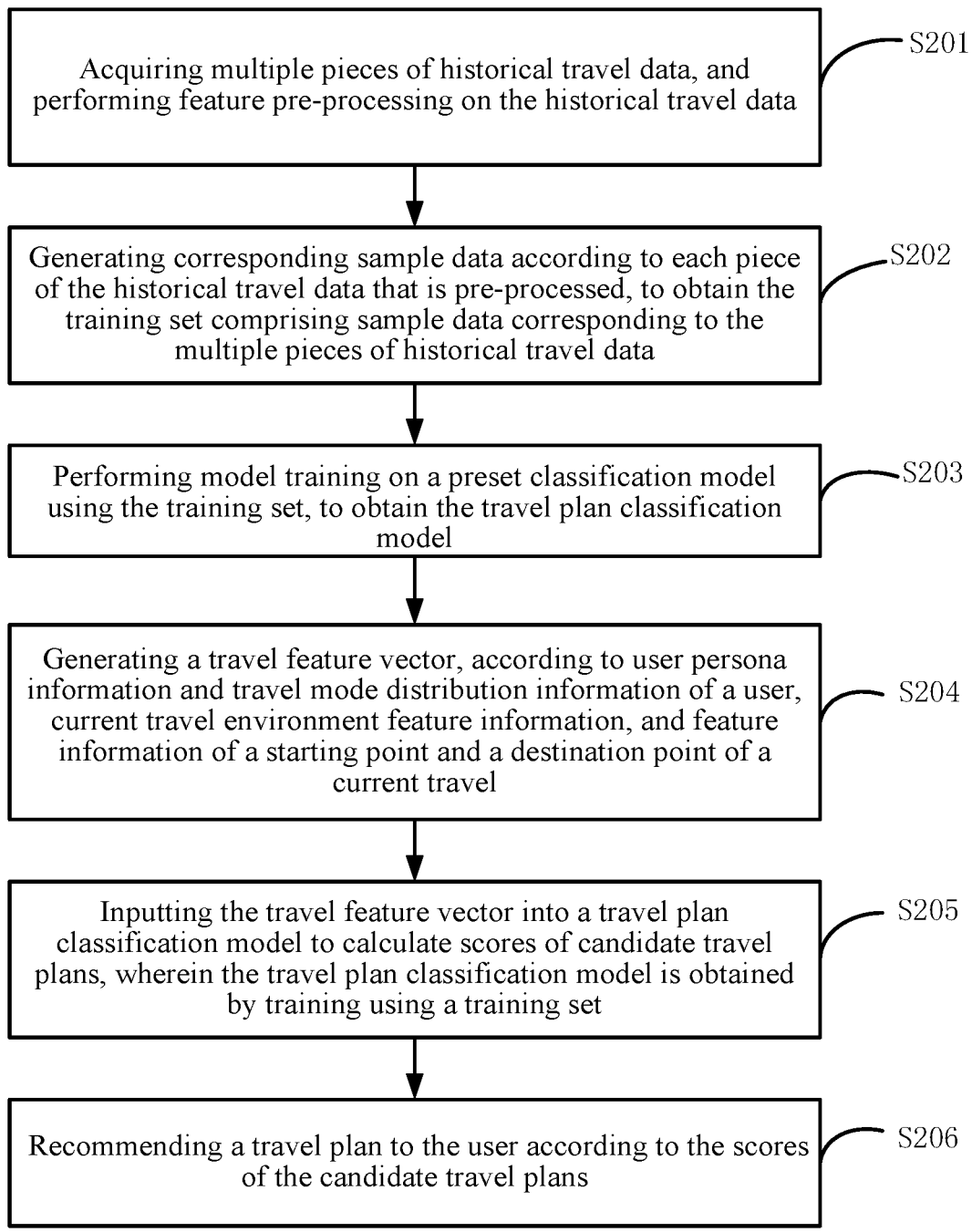
FIG. 2 is a flowchart of a travel plan recommendation method according to Embodiment II of the present disclosure.
Figure 3:
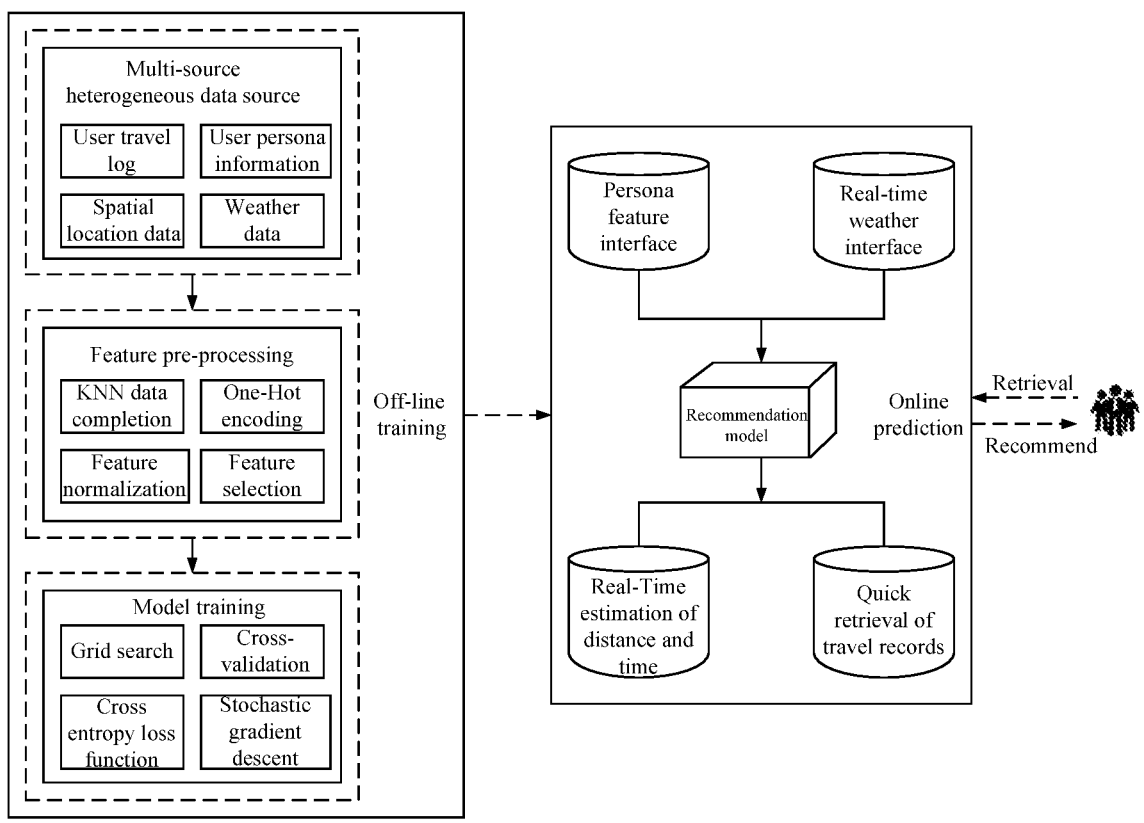
FIG. 3 is a frame diagram of travel plan recommendation according to Embodiment II of the present disclosure.
Figure 4:
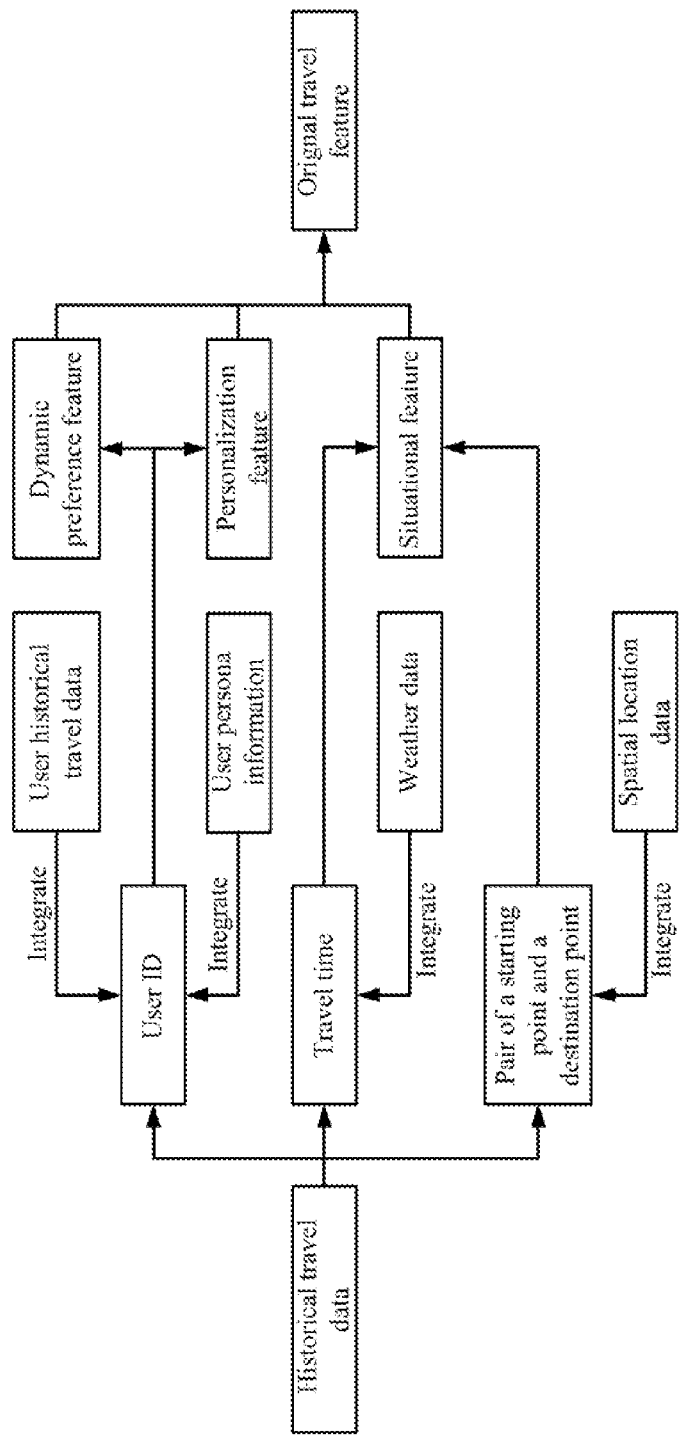
FIG. 4 is a flowchart of multi-source heterogeneous data fusion according to Embodiment II of the present disclosure.

FIG. 2 is a flowchart of a travel plan recommendation method according to Embodiment II of the present disclosure. FIG. 3 is a frame diagram of a travel plan recommendation according to Embodiment II of the present disclosure. FIG. 4 is a flowchart of multi-source heterogeneous data fusion according to Embodiment II of the present disclosure.

On the basis of the foregoing Embodiment I, in this embodiment, before the travel feature vector is inputted into the travel plan classification model to calculate the scores of the candidate travel plans, the method further includes: acquiring multiple pieces of historical travel data, and performing feature preprocessing on the historical travel data; generating corresponding sample data according to each piece of the historical travel data that is pre-processed, to obtain a training set including sample data corresponding to the multiple pieces of historical travel data; and performing model training on the preset classification model using the training set to obtain the travel plan classification model.

As shown in FIG. 3, in this embodiment, the travel plan recommendation method includes two stages: offline training and online prediction. As shown in FIG. 2 and FIG. 3, the specific steps of the method are as follows (where steps S201 to S203 are the processing processes of the offline training stage, and steps S204-S206 are the processing processes of the online prediction stage):

Step S201: acquiring multiple pieces of historical travel data, and performing feature pre-processing on the historical travel data.

In this embodiment, the feature data of the current travel is obtained by acquiring multi-source heterogeneous data and performing multi-source heterogeneous data fusion. As shown in FIG. 3 and FIG. 4, the acquired multi-source heterogeneous data may include: user history travel data, user persona information, spatial position data, weather data, and the like. The user history travel data may be obtained from user travel logs shown in FIG. 3, and the spatial position data may be obtained from map data.

Optionally, the acquiring multiple pieces of historical travel data includes:

acquiring multiple pieces of historical travel information, where the historical travel information includes at least the following: a user identifier, a starting point, a destination point and a travel period; acquiring user persona information and travel mode distribution information corresponding to a user identifier in each piece of the historical travel information, the travel environment feature information corresponding to a travel period in each piece of the historical travel information, feature information of a starting point and a destination point in each piece of the historical travel information, and plan selection true value data corresponding to each piece of the historical travel information, to obtain historical travel data corresponding to each piece of the historical travel information.

In this embodiment, the user is denoted as U, the starting point is denoted as O, the destination point is denoted as D, the travel period is denoted as T, and one piece of historical travel information may be written as a 4-tuple Data=(U, O, D, T).

As shown in FIG. 4, after the multiple pieces of historical travel information are acquired, the acquired user persona information is integrated with the historical travel information according to the user identifier (for example, the user ID), to obtain the user persona information corresponding to each piece of the historical travel information, that is, a personalization feature of the user corresponding to the historical travel information; the user travel modes in the historical travel data of the user are statically counted according to the user identifier to obtain the travel mode distribution information corresponding to each user identifier, and the travel mode distribution information corresponding to the user identifier is integrated with the historical travel information according to the user identifier to obtain the travel mode distribution information corresponding to each piece of the historical travel information (that is, the user's dynamic preference feature); the weather data is integrated with the historical travel information according to the travel period to obtain the travel environment feature information corresponding to each piece of the historical travel information; and the spatial position data is integrated with the historical travel information according to the starting point and the destination point (referred to as "starting/destination point" in FIG. 4) to obtain the feature information of the starting point and the destination point of each piece of the historical travel information.

In addition, the plan selection truth value data corresponding to each piece of the historical travel information may be obtained from the user history travel data according to the 4-tuple used to uniquely determine one piece of historical travel information.

Further, after the multiple pieces of historical travel data are acquired, feature pre-processing is performed on the historical travel data, specifically including:

performing One-Hot encoding processing on a category-type feature in the historical travel data; performing abnormal-value processing on a numerical value-type feature in the historical travel data; and performing normalization processing on the numerical value-type feature in the historical travel data on which the abnormal-value processing is performed.

Optionally, in the performing normalization processing on the numerical value-type feature, a Min-Max Normalization manner or other existing normalization manners may specifically be used to eliminate the influence of the dimension, which will not be detailed herein in this embodiment.

Optionally, before the One-Hot encoding processing is performed on the category-type feature in the historical travel data, the following processing may also be performed: calculating, for respective categories of each of the category-type feature, a value proportion of each of the categories; aggregating categories whose value proportions are less than a preset threshold into one category. Preset thresholds corresponding to different features may be different, and the preset thresholds corresponding to the respective features may be set by the skilled persons according to actual scenarios and experience, which will not be specifically limited in this embodiment.

For example, for a monthly income level in the historical travel data, the preset threshold may be 5%, and the monthly income level may include the following categories: 0 to 2000, 2000 to 5000, 5000 to 10000, 10000 to 30000, 30000 to 50000, 50000 to 100000, 100000 to 200000, more than 200,000, etc. Value proportions of the respective categories of this feature are statistically counted, and if it is assumed that the value proportions of the following categories are all less than 5%: 0 to 2000, 100000 to 200,000 and more than 200000, and other categories of values are all greater than 5%, then the rare categories with proportions less than 5% (including: 0 to 2,000, 100000 to 200000 and more than 200000) may be aggregated and be uniformly named as "other", and then the category-type feature in the historical travel data is converted to computable values by the manner of the One-Hot encoding.

Optionally, the performing abnormal-value processing on the numerical value-type features in the historical travel data may be implemented as follows:

calculating an $N^{th}$ percentile value corresponding to each of the numerical value-type features, where N is a positive integer; taking a numerical value-type feature of an original feature vector that is greater than a corresponding $N^{th}$ percentile number as an abnormal numerical value-type feature; assigning an $N^{th}$ percentile value corresponding to the abnormal numerical value-type feature to the abnormal numerical value-type feature.

For example, N may be 99. For the numerical value-type features in the historical behavior data, firstly, a $99^{th}$ percentile value corresponding to each feature is statistically counted, and the $99^{th}$ percentile corresponding to each feature is taken as an abnormal boundary value corresponding to the each feature; the feature value of each piece of the historical behavior data is compared with an abnormal boundary value corresponding to the feature, if the feature value is greater than the abnormal boundary value corresponding to the feature, the feature value is taken as an abnormal numerical value-type feature, and the feature is intercepted by assigning the abnormal boundary value corresponding to the feature to the feature, so as to mitigate the influence of the abnormal value.

Removing the abnormal numerical value-type feature plays a critical role for the effect of the model, for example, if a user incorrectly enters a pair of a starting point and a destination point that are transnational, then the historical behavior feature data may have a record with an extremely long total distance, thus misleading the learning process of the model.

Optionally, the performing feature pre-processing on the historical travel data may also include:

calculating importance levels of respective features in the historical travel data using a machine learning-based feature selection manner; performing feature selection on the historical travel data according to the importance levels of the respective features in the historical travel data, to retain a feature whose importance level is greater than a preset importance level. The preset importance level may be set by the skilled persons according to the actual scenario and experience, which will not be specifically limited in this embodiment.

The machine learning-based feature selection manner may be any manner implementations for selecting important features in the model training of the machine learning in the prior art, which will not be detailed herein in this embodiment.

For example, for one piece of user travel data, the plan that the user eventually clicked is taken as the true value data, a One-Hot code of the true value data is taken as a final label of this piece of data, a tree-based classification model is formed, the importance levels of respective features are calculated and outputted through the tree-based classification model, the features are filtered according to the importance level of each feature, and the relevant features with a importance level of 0 are removed, thereby reducing the space-time complexity of the model training test.

Step S202: generating corresponding sample data according to each piece of the pre-processed historical travel data, to obtain a training set including sample data corresponding to multiple piece of historical travel data.

In this step, the generating corresponding sample data according to each piece of the pre-processed historical travel data may be specifically implemented as follows:

generating a travel feature vector according to user persona information and travel mode distribution information of a user, travel environment feature information, and feature information of a starting point and a destination point in the piece of historical travel data; selecting the true value data according to the plan of the piece of historical travel data, and generating a label of the travel feature vector corresponding to that piece of historical travel data; taking the travel feature vector corresponding to that piece of historical travel data and its label as a piece of sample data.

For example, the generating a travel feature vector according to user persona information and travel mode distribution information of a user, travel environment feature information, and feature information of a starting point and a destination point in the piece of historical travel data, includes:

splicing the user persona information and travel mode distribution information, travel environment feature information, and the feature information of a starting point and a destination point corresponding to the piece of historical travel information to generate an original feature vector corresponding to the piece of historical travel information; completing data for null value feature in the original feature vector to obtain the travel feature vector.

Specifically, a K-Nearest Neighbor (KNN) classification algorithm may be used to perform data complementation on the null value feature in the original feature vector to obtain the travel feature vector, including:

calculating cosine similarity between a non-null value feature vector and the corresponding feature vector in other historical travel data, according to the non-null value feature vector including the non-null value feature in the original feature vector; determining the K pieces of other historical travel data with the largest cosine similarity between their corresponding feature vectors and the non-null value feature vector as the K pieces of closest data of the original feature vector, where K is a positive integer; filling the null value feature of the original feature vector with the mean or mode value of the corresponding feature values in the K pieces of closest data. Where K is a hyper-parameter and may be set by the skilled persons according to the actual application scenario and experience.

For example, the original feature vector may be denoted as $F^t$, a null value feature of the original feature vector denoted as $F_i^t$, and a non-null value feature of the original feature vector is $F_{j\neq i}^t$. These non-null value features may form a non-null value feature vector, corresponding vectors of the non-null value feature vector in other sample data may be acquired, and cosine similarity between the non-null value feature vector and the corresponding vectors in other sample data may be calculated, and the cosine similarity may also be used as the similarity between the historical travel data corresponding the original feature vector and other sample data; and then the K pieces of other sample data with the largest similarity between their corresponding vectors and the non-null value feature vector as the K pieces of closest data. M is used to indicate the set of K pieces of closest data, which may be expressed as $$M = topK\left(\frac{<F_{j\neq i}^t, F_{j\neq i}^m>}{\|F_{j\neq i}^t\|\|F_{j\neq i}^m\|}\right),$$

where m is used to indicate any one of the closest data in M, and $F_i^m$ indicates a feature in m that is corresponding to $F_i^t$, then $$F_i^t = \frac{\Sigma_{m\in M} F_i^m}{K}.$$

Where i and j are positive integers.

In this embodiment, the selecting the true value data according to the plan of the piece of historical travel data, and generating a label of the travel feature vector corresponding to that piece of historical travel data includes:

taking the One-Hot code corresponding to the plan selection true value data corresponding to the piece of historical travel data as the label of the travel feature vector corresponding to the piece of historical travel data.

Where the label includes the One-Hot code according to selection true value data of each travel plan, and the One-Hot code may be used as the score corresponding to each travel plan.

The manner for performing the One-Hot encoding on the selection true value data of each travel plan may be set by the skilled persons according to actual needs, which will not be specifically limited herein in this embodiment.

In addition, in this embodiment, the encoding rules used for performing the One-Hot encoding on different types of data are different.

For example, one piece of historical travel data may include multiple travel plans and the number of times user clicked on each travel plan, so that the number of times user clicked on each travel plan may be One-Hot encoded to obtain the label of the travel feature vector corresponding to the piece of historical travel data.

Through this step, one piece of sample data may be generated according to each piece of historical travel data, and the training set formed by the sample data corresponding to the multiple pieces of historical travel data. In this embodiment, a large amount of historical data may be collected to obtain an abundant training set.

Step S203: performing model training on the preset classification model using the training set, to obtain a travel plan classification model.

Using the training set, model training is performed on the preset classification model by taking a cross entropy loss function as the objective function and using the stochastic gradient descent manner as the model optimization manner through grid search and cross-validation, to determine a set of optimal parameters of the model, and then using of the set of the optimal parameters as model parameters to obtain the travel plan classification model.

For example, the travel plan classification model may be a multi-type xgboost classifier, which is configured to output the score of each candidate travel plan according to the inputted travel feature vector.

The above steps S201 to S203 are processing processes of the offline training stage. After the travel plan classification model is obtained by training, the travel plan classification model is s made persistent for invocation by online services.

Optionally, after the travel plan classification model is obtained by training, the travel plan classification model may be further optimized by training according to the latest travel data, so that the travel plan classification model has ability for evolution to an extent, which will generate a continuous strengthening effect on the recommendation for the optimal plan along with model being on line and accumulation of data.

The following steps S204 to S206 are processing processes of the online prediction stage. The travel plan classification model is denoted as f, in the online prediction stage, for one piece of user travel demand, the user persona information is obtained through a persona feature interface, the weather data is obtained through the real-time weather interface, the distance between the starting point and the destination point is calculated by distance-time real-time estimation, he user history travel data is obtained by quick retrieval of historical travel records, and then the travel feature vector F is formed, the trained travel plan classification model is used for rating, and the score vector f (F) including the score of each travel plan is outputted, and the travel plan(s) with the highest score is used as the best travel plan in the current situation.

Step S204: generating a travel feature vector according to the user persona information and the travel mode distribution information of the user, current travel environment feature information, and feature information of the starting point and the destination point of the current travel.

An application scenario of this embodiment is: the terminal device receives a travel plan query request (such as a navigation request) entered by the user, and the travel plan query request includes at least a user identifier (such as a user ID) of the user, the starting point and the destination point. According to the travel plan query request of the user, the terminal device first acquires feature data of the current travel: the user persona information and the travel mode distribution information of the user, the current travel environment feature information, and the feature information of the starting point and the destination of the current travel, and then the terminal device generates the travel feature vector according to the feature data of the current travel.

In this step, after the feature data of the current travel is acquired, the method similar to that in step S201 may be used to pre-process the feature data of the current travel, which will not be repeated herein in this embodiment.

Step S205, inputting the travel feature vector into the travel plan classification model to calculate the scores of the candidate travel plans.

The candidate travel plans, determined by the terminal device according to the starting point and the destination point, are feasible travel plans through which the destination point can be reached starting from the starting point. Each pair of the starting point and the destination point corresponds to multiple candidate travel plans In this embodiment, based on the machine learning technology, the preset classification model is trained in advance using the training set, so as to obtain the travel plan classification model. For the specific implementation, reference is made to the detailed description in Embodiment II. After the travel plan classification model is obtained by training, the travel plan classification model is made persistent for invocation by online services.

For example, the travel plan classification model may be a multi-type xgboost classifier, which is configured to output the score of each candidate travel plan according to the inputted travel feature vector.

After the travel feature vector of the current travel is obtained, the terminal device invokes the travel plan classification model in this step, inputs the travel feature vector into the travel plan classification model, and calculates the score of each candidate travel plan through the travel plan classification model.

Step S206: recommending a travel plan to the user according to the scores of the candidate travel plans.

After the score of the each candidate travel plan is calculated, one or more candidate travel plans with the highest score are recommended to the user according to the order of the scores from high to low.

In this embodiment of the present disclosure, the travel plan classification model is obtained by training with the comprehensive consideration of the diversity of users, the diversity of the travel environment in time and space and dynamics of the user's travel preference, and the travel feature vector is generated according to the user persona information and the travel mode distribution information of the user, the current travel environment feature information and the feature information of the starting point and the destination point of the current travel, the travel feature vector is inputted into the travel plan classification model to calculate the scores of the candidate travel plans, and the travel plan recommended to the user according to the scores of the candidate travel plans, which improves the accuracy and stability of the travel plan recommendation, and makes the travel plan recommendation more accurate and effective.

Embodiment III

Figure 5:
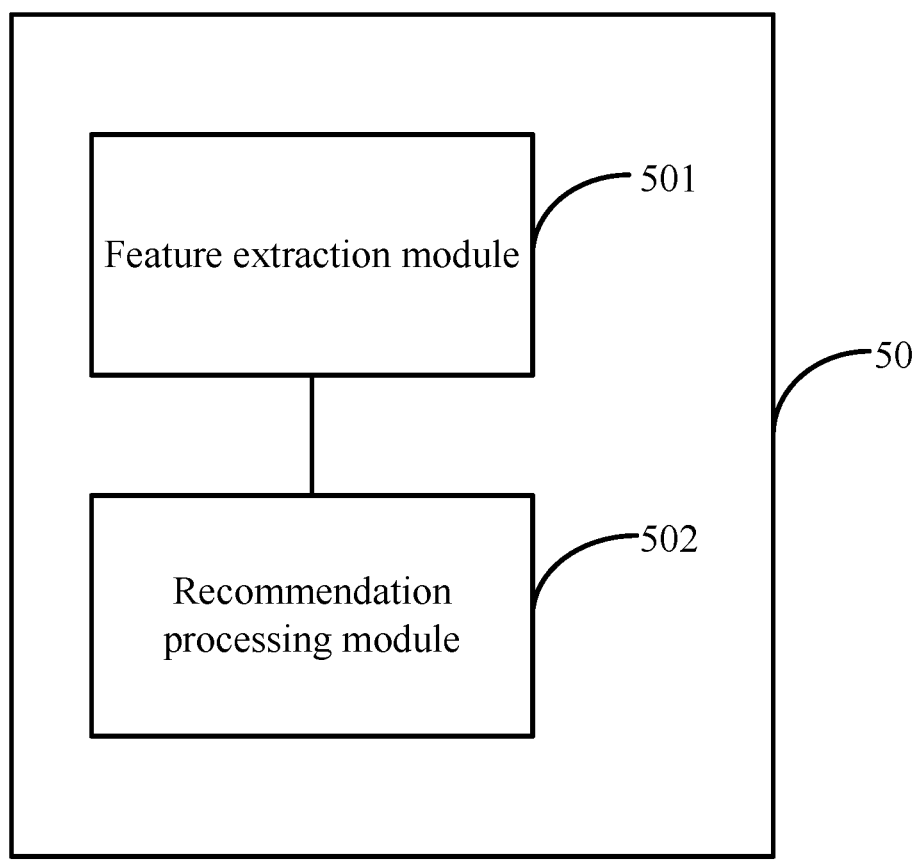
FIG. 5 is a schematic structural diagram of a travel plan recommendation apparatus according to Embodiment III of the present disclosure.

FIG. 5 is a schematic structural diagram of a travel plan recommendation apparatus according to Embodiment III of the present disclosure. The travel plan recommendation apparatus according to this embodiment of the present disclosure may perform the processing flows according to the travel plan recommendation method embodiments. As shown in FIG. 5, the travel plan recommendation apparatus 50 includes: a feature extraction module 501 and a recommendation processing module 502.

Specifically, the feature extraction module 501 is configured to generate a travel feature vector, according to user persona information and travel mode distribution information of a user, current travel environment feature information, and feature information of a starting point and a destination point of a current travel.

The recommendation processing module 502 is configured to input the travel feature vector into a travel plan classification model to calculate scores of candidate travel plans, where the travel plan classification model is obtained by training using a training set.

The recommendation processing module 502 is further configured to recommend a travel plan to the user according to the scores of the candidate travel plans.

The apparatus according to this embodiment of the present disclosure may be specifically configured to perform the method embodiment according to foregoing Embodiment I, and the specific functions thereof will not be repeated herein.

In this embodiment of the present disclosure, the travel plan classification model is obtained by training with the comprehensive consideration of the diversity of users, the diversity of the travel environment in time and space and dynamics of the user's travel preference, and the travel feature vector is generated according to the user persona information and the travel mode distribution information of the user, the current travel environment feature information and the feature information of the starting point and the destination point of the current travel, the travel feature vector is inputted into the travel plan classification model to calculate the scores of the candidate travel plans, and the travel plan recommended to the user according to the scores of the candidate travel plans, which improves the accuracy and stability of the travel plan recommendation, and makes the travel plan recommendation more accurate and effective.

Embodiment IV

Figure 6:
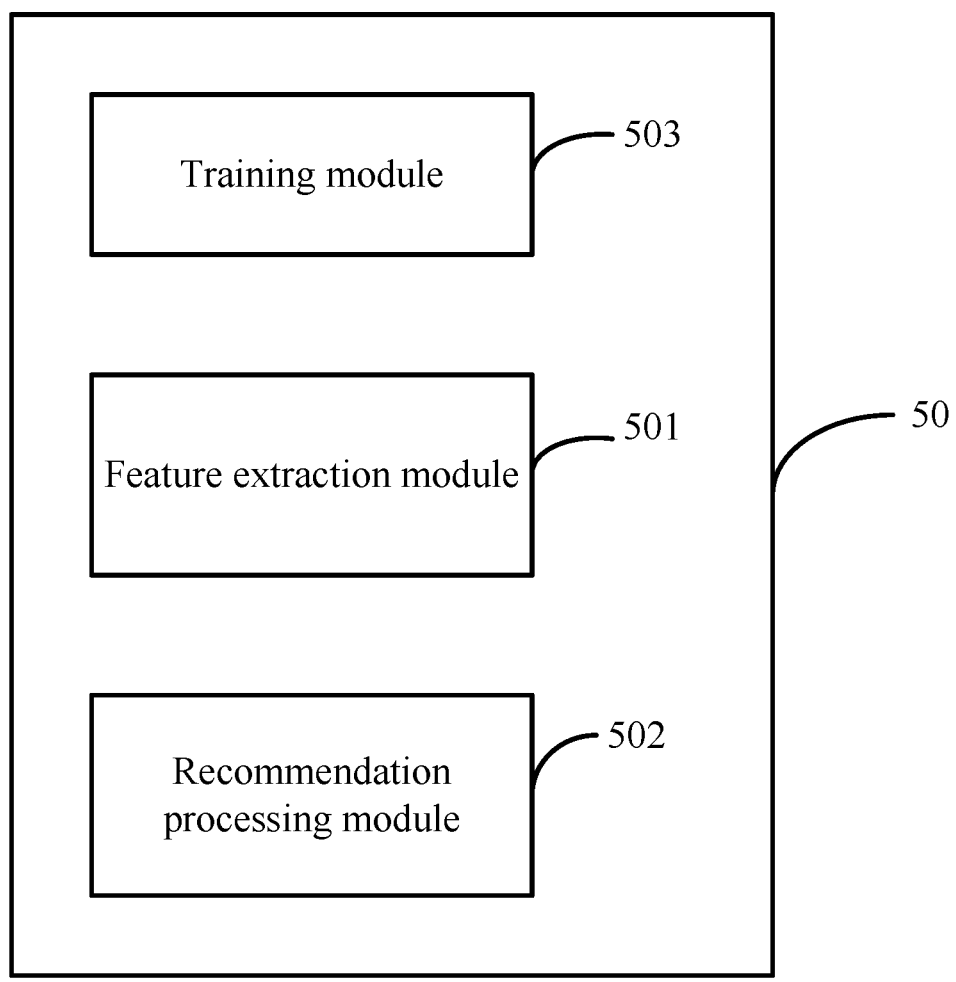
FIG. 6 is a schematic structural diagram of a travel plan recommendation apparatus according to Embodiment IV of the present disclosure.

FIG. 6 is a schematic structural diagram of a travel plan recommendation apparatus according to Embodiment IV of the present disclosure. On the basis of foregoing Embodiment III, in this embodiment, as shown in FIG. 6, the travel plan recommendation apparatus 50 further includes: a training module 503.

Specifically, the training module 503 is configured to:

acquire multiple pieces of historical travel data, and perform feature pre-processing on the historical travel data; generate corresponding sample data according to each piece of the historical travel data that is pre-processed, to obtain the training set including sample data corresponding to the multiple pieces of historical travel data; and perform model training on a preset classification model using the training set, to obtain the travel plan classification model.

Optionally, the training module 503 is further configured to:

acquire multiple pieces of historical travel information, where the historical travel information includes at least the following: a user identifier, a starting point, a destination point and a travel period; acquire user persona information and travel mode distribution information corresponding to a user identifier in each piece of the historical travel information, the travel environment feature information corresponding to a travel period in each piece of the historical travel information, feature information of a starting point and a destination point in each piece of the historical travel information, and plan selection true value data corresponding to each piece of the historical travel information, to obtain historical travel data corresponding to each piece of the historical travel information.

Optionally, the training module 503 is further configured to:

perform One-Hot encoding processing on a category-type feature in the historical travel data; perform abnormal-value processing on a numerical value-type feature in the historical travel data; and perform normalization processing on the numerical value-type feature in the historical travel data on which the abnormal-value processing is performed.

Optionally, the training module 503 is further configured to:

generate a travel feature vector corresponding to that piece of the historical travel data, according to user feature information and travel mode distribution information, travel environment feature information, feature information of a starting point and a destination point in that piece of the historical travel data; generate a label of the travel feature vector corresponding to that piece of the historical travel data, according to plan selection true value data in that piece of the historical travel data; take the travel feature vector corresponding to that piece of the historical travel data and its label as a piece of sample data.

Optionally, the training module 503 is further configured to:

splicing the user persona information and travel mode distribution information, the travel environment feature information, and the feature information of the starting point and the destination point corresponding to that piece of the historical travel information, to generate an original feature vector corresponding to that piece of the historical travel information; and perform data completion on a null value feature in the original feature vector, to obtain the travel feature vector.

Optionally, the training module 503 is further configured to:

calculate, according to a non-null value feature vector including a non-null value feature in the original feature vector, cosine similarity between the non-null value feature vector and corresponding feature vectors in other historical travel data; determine K pieces of the other historical travel data with largest cosine similarity between their corresponding feature vectors and the non-null value feature vector as K closest pieces of data of the original feature vector, where K is a positive integer; fill the null value feature of the original feature vector with a mean or mode value of the corresponding feature values in the K closest pieces of data.

Optionally, the training module 503 is further configured to:

calculate, for respective categories of each of the category-type feature, a value proportion of each of the categories; aggregate categories whose value proportions are less than a preset threshold into one category.

Optionally, the training module 503 is further configured to:

calculate a $N^{th}$ percentile value corresponding to each of the numerical value-type feature, where N is a positive integer; take a numerical value-type feature in the original feature vector that is greater than a corresponding $N^{th}$ percentile value as an abnormal numerical value-type feature; assign the $N^{th}$ percentile corresponding to the abnormal numerical value-type feature to the abnormal numerical value-type feature.

Optionally, the training module 503 is further configured to:

calculate importance levels of respective features in the historical travel data using a machine learning-based feature selection manner; perform feature selection on the historical travel data according to the importance levels of the respective features in the historical travel data, to retain a feature whose importance level is greater than a preset importance level.

Optionally, the training module 503 is further configured to:

take a One-Hot code corresponding to the plan selection true value data corresponding to that piece of the historical travel data as the label of the travel feature vector corresponding to that piece of the historical travel data.

Optionally, the travel plan classification model is a multi-type xgboost classifier.

Optionally, the feature information of the starting point and the destination of the current travel includes at least the following: a distance between the starting point and the destination point; a number of bus stops, a number of shared bicycles and a number of subway stations that are located around the starting point; and a number of bus stops, a number of shared bicycles and a number of subway stations that are located around the destination point.

Optionally, the training module 503 is further configured to:

perform model training on the preset classification model by using the training set, taking a cross entropy loss function as an objective function, using a stochastic gradient descent method, and using grid search and cross-validation manner, to obtain the travel plan classification model.

The apparatus according to this embodiment of the present disclosure may be specifically configured to perform the method embodiment according to foregoing Embodiment II, and the specific functions thereof will not be repeated herein.

In this embodiment of the present disclosure, the travel plan classification model is obtained by training with the comprehensive consideration of the diversity of users, the diversity of the travel environment in time and space and dynamics of the user's travel preference, and the travel feature vector is generated according to the user persona information and the travel mode distribution information of the user, the current travel environment feature information and the feature information of the starting point and the destination point of the current travel, the travel feature vector is inputted into the travel plan classification model to calculate the scores of the candidate travel plans, and the travel plan recommended to the user according to the scores of the candidate travel plans, which improves the accuracy and stability of the travel plan recommendation, and makes the travel plan recommendation more accurate and effective.

Embodiment V

Figure 7:
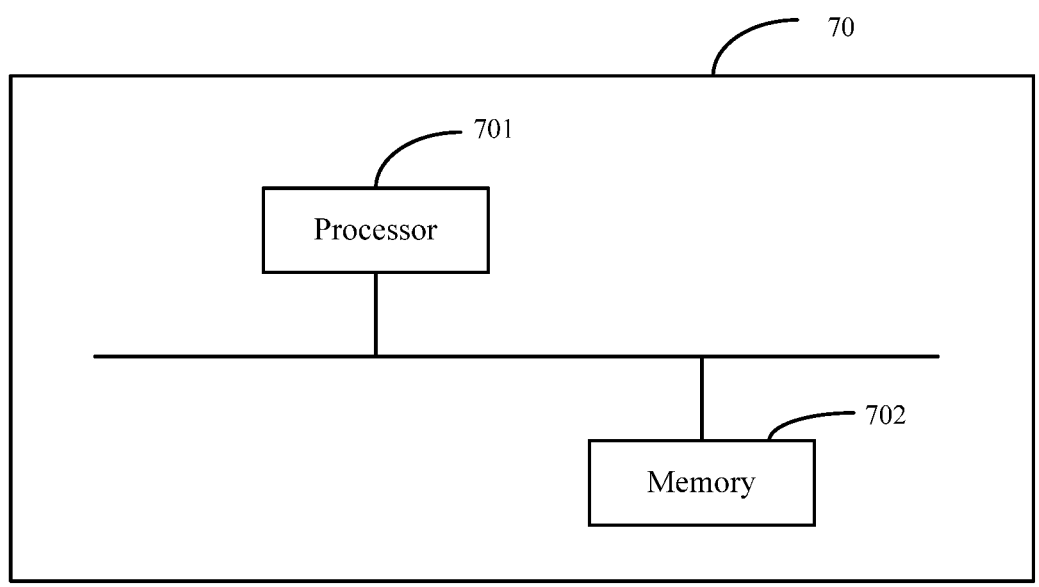
FIG. 7 is a schematic structural diagram of a travel plan recommendation device according to Embodiment V of the present disclosure.

FIG. 7 is a schematic structural diagram of a travel plan recommendation device according to Embodiment V of the present disclosure. As shown in FIG. 7, the travel plan recommendation device 70 includes a processor 701, a memory 702, and a computer program that is stored on the memory 702 and executable by the processor 701.

The processor 701, when executing the computer program stored on the memory 702, implements the travel plan recommendation method according to any one of the above method embodiments.

In this embodiment of the present disclosure, the travel plan classification model is obtained by training with the comprehensive consideration of the diversity of users, the diversity of the travel environment in time and space and dynamics of the user's travel preference, and the travel feature vector is generated according to the user persona information and the travel mode distribution information of the user, the current travel environment feature information and the feature information of the starting point and the destination point of the current travel, the travel feature vector is inputted into the travel plan classification model to calculate the scores of the candidate travel plans, and the travel plan recommended to the user according to the scores of the candidate travel plans, which improves the accuracy and stability of the travel plan recommendation, and makes the travel plan recommendation more accurate and effective.

In addition, embodiments of the present disclosure further provide a computer readable storage medium having a computer program stored thereon, where the computer program, when being executed by the processor, implements the travel plan recommendation method according to any one of the foregoing method embodiments.

In the embodiments according to the present disclosure, it should be understood that the disclosed apparatuses and methods may be implemented in other manners. For example, the apparatus embodiments described above are merely illustrative. For example, the division of the unit is only a division of logical functions. In actual implementations, there may be another division manner, for example, multiple units or components may be combined or integrated into another system, or some features can be omitted or not executed. In addition, the mutual coupling or direct coupling or communication connection shown or discussed may be an indirect coupling or communication connection through some interfaces, devices or units, and may be in an electrical, a mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solutions of the embodiment.

In addition, various functional units in various embodiments of the present disclosure may be integrated into one processing unit, or various units may exist physically separately, or two or more units may be integrated into one unit. The above integrated units may be implemented in the form of hardware or in the form of hardware and software functional units.

The above-described integrated unit implemented in the form of a software functional unit can be stored in a computer readable storage medium. The above software functional unit is stored in a storage medium and includes several instructions to cause a computer device (which may be a personal computer, a server, or a network device, etc.) or a processor to perform some of the steps of the methods of the various embodiments of the present disclosure. The above-mentioned storage medium includes: a U disk, a mobile hard disk, a read-only memory (ROM), a random access memory (RAM), a magnetic disk, or an optical disk, etc., which can store program codes.

A person skilled in the art can clearly understand that for the convenience and brevity of the description, the division of each functional module described above is only for exemplifying. In practical applications, the above functions may be assigned to be implemented by different functional modules as needed, that is, the internal structure of the apparatus is divided into different functional modules to perform all or part of the functions described above. For the specific working processes of the apparatuses described above, reference can be made to the corresponding processes in the foregoing method embodiments, which will not be repeated herein.

Other embodiments of the disclosure are readily apparent to those who skilled in the art, after the specification is taken into account and the disclosure disclosed herein is practiced. The present disclosure is intended to cover any variations, uses, or adaptations of the present disclosure, which are in accordance with the general principles of the disclosure and include common knowledge or common technical means in the art that are not disclosed in the present disclosure. The specification and embodiments are regarded as illustrative only, the true scope and spirit of the disclosure are pointed out by the following claims.

It should be understood that, the present disclosure is not limited to the specific structures described above and illustrated in the drawings, and various modifications and changes can be made without departing from the scope thereof. The scope of the disclosure is limited only by the appended claims.

What is claimed is:

1. A travel plan recommendation method, comprising:
generating a travel feature vector according to user persona information and travel mode distribution information of a user, current travel environment feature information, and feature information of a starting point and a destination point of a current travel;
inputting the travel feature vector into a travel plan classification model to calculate scores of candidate travel plans, wherein the travel plan classification model is obtained by training using a training set; and
recommending a travel plan from the candidate travel plans to the user according to the scores of the candidate travel plans, wherein the feature information of the starting point and the destination point of the current travel comprises at least the following: a distance between the starting point and the destination point; a number of bus stops, a number of shared bicycles and a number of subway stations that are located around the starting point; and a number of bus stops, a number of shared bicycles and a number of subway stations that are located around the destination point.

2. The method according to claim 1, wherein the travel plan classification model is trained by:
acquiring multiple pieces of historical travel data, and performing feature pre-processing on the historical travel data;
generating corresponding sample data according to each piece of the historical travel data that is pre-processed, to obtain the training set comprising sample data corresponding to the multiple pieces of historical travel data;
performing model training on a preset classification model using the training set, to obtain the travel plan classification model.

3. The method according to claim 2, wherein the acquiring multiple pieces of historical travel data comprises:
acquiring multiple pieces of historical travel information, wherein the historical travel information comprises at least the following: a user identifier, a starting point, a destination point and a travel period;
acquiring user persona information and travel mode distribution information corresponding to a user identifier in each piece of the historical travel information, travel environment feature information corresponding to a travel period in each piece of the historical travel information, feature information of a starting point and a destination point in each piece of the historical travel information, and plan selection true value data corresponding to each piece of the historical travel information, to obtain historical travel data corresponding to each piece of the historical travel information.

4. The method according to claim 3, wherein the performing feature pre-processing on the historical travel data comprises:
performing One-Hot encoding processing on a category-type feature in the historical travel data;
performing abnormal-value processing on a numerical value-type feature in the historical travel data;
performing normalization processing on the numerical value-type feature in the historical travel data on which the abnormal-value processing is performed.

5. The method according to claim 4, wherein before the performing One-Hot encoding processing on a category-type feature in the historical travel data, the training of the travel plan classification model further comprises:
calculating, for respective categories of each of the category-type feature, a value proportion of each of the categories;
aggregating categories whose value proportions are less than a preset threshold into one category.

6. The method according to claim 4, wherein the performing abnormal-value processing on a numerical value-type feature in the historical travel data comprises:
calculating an Nth percentile value corresponding to each of the numerical value-type feature, wherein N is a positive integer;
taking a numerical value-type feature in an original feature vector that is greater than a corresponding Nth percentile value as an abnormal numerical value-type feature;
assigning the Nth percentile corresponding to the abnormal numerical value-type feature to the abnormal numerical value-type feature.

7. The method according to claim 4, wherein the performing feature pre-processing on the historical travel data further comprises:
calculating importance levels of respective features in the historical travel data using a machine learning-based feature selection manner;
performing feature selection on the historical travel data according to the importance levels of the respective features in the historical travel data, to retain a feature whose importance level is greater than a preset importance level.

8. The method according to claim 3, wherein the generating corresponding sample data according to a certain piece of the historical travel data that is pre-processed comprises:
generating a travel feature vector corresponding to that piece of the historical travel data, according to user feature information and travel mode distribution information, travel environment feature information, feature information of a starting point and a destination point in that piece of the historical travel data;
generating a label of the travel feature vector corresponding to that piece of the historical travel data, according to plan selection true value data in that piece of the historical travel data;
taking the travel feature vector corresponding to that piece of the historical travel data and its label as a piece of sample data.

9. The method according to claims 8, wherein the generating a travel feature vector corresponding to that piece of the historical travel data, according to user feature information and travel mode distribution information, travel environment feature information, feature information of a starting point and a destination point in that piece of the historical travel data comprises:
splicing the user persona information and travel mode distribution information, the travel environment feature information, and the feature information of the starting point and the destination point corresponding to that piece of the historical travel information, to generate an original feature vector corresponding to that piece of the historical travel information;
performing data completion on a null value feature in the original feature vector, to obtain the travel feature vector.

10. The method according to claim 9, wherein the performing data completion on a null value feature in the original feature vector, to obtain the travel feature vector comprises:
  calculating, according to a non-null value feature vector comprising a non-null value feature in the original feature vector, cosine similarity between the non-null value feature vector and corresponding feature vectors in other historical travel data;
  determining K pieces of the other historical travel data with largest cosine similarity between their corresponding feature vectors and the non-null value feature vector as K closest pieces of data of the original feature vector, wherein K is a positive integer;
  filling the null value feature of the original feature vector with a mean or mode value of the corresponding feature values in the K closest pieces of data.

11. The method according to claim 5, wherein the generating a label of the travel feature vector corresponding to that piece of the historical travel data, according to plan selection true value data in that piece of the historical travel data comprises:
  taking a One-Hot code corresponding to the plan selection true value data corresponding to that piece of the historical travel data as the label of the travel feature vector corresponding to that piece of the historical travel data.

12. The method according to claim 2, wherein the performing model training on a preset classification model using the training set, to obtain the travel plan classification model comprises:
  performing model training on the preset classification model by using the training set, taking a cross entropy loss function as an objective function, using a stochastic gradient descent method, and using grid search and cross-validation manner, to obtain the travel plan classification model.

13. The method according to claim 1, wherein the travel plan classification model is a multi-type xgboost classifier, the generating a travel feature vector comprises:
  generating a travel feature vector, in response to receiving a travel plan query request entered by the user on a terminal device, the travel plan query request comprising at least the starting point and the destination point of the current travel; and
  the recommending a travel plan to the user according to the scores of the candidate travel plans, comprises:
  selecting, from the candidate travel plans, at least one travel plan with a highest score, and recommending the selected at least one travel plan to the user.

14. A travel plan recommendation apparatus, comprising:
  a memory, a processor, and a computer program that is stored in the memory and executable on the processor, wherein the processor, when executing the computer program, causing the processor to:
  generate a travel feature vector according to user persona information and travel mode distribution information of a user, current travel environment feature information, and feature information of a starting point and a destination point of a current travel;
  input the travel feature vector into a travel plan classification model to calculate scores of candidate travel plans, wherein the travel plan classification model is obtained by training using a training set;
  recommend a travel plan to the user according to the scores of the candidate travel plans,
  wherein the feature information of the starting point and the destination point of the current travel comprises at least the following: a distance between the starting point and the destination point; a number of bus stops, a number of shared bicycles and a number of subway stations that are located around the starting point; and a number of bus stops, a number of shared bicycles and a number of subway stations that are located around the destination point.

15. The apparatus according to claim 14, wherein the computer program further causes the processor to:
  acquire multiple pieces of historical travel data, and perform feature pre-processing on the historical travel data;
  generate corresponding sample data according to each piece of the historical travel data that is pre-processed, to obtain the training set comprising sample data corresponding to the multiple pieces of historical travel data;
  perform model training on a preset classification model using the training set, to obtain the travel plan classification model.

16. The apparatus according to claim 15, wherein the computer program further causes the processor to:
  acquire multiple pieces of historical travel information, wherein the historical travel information comprises at least the following: a user identifier, a starting point, a destination point and a travel period;
  acquire user persona information and travel mode distribution information corresponding to a user identifier in each piece of the historical travel information, travel environment feature information corresponding to a travel period in each piece of the historical travel information, feature information of a starting point and a destination point in each piece of the historical travel information, and plan selection true value data corresponding to each piece of the historical travel information, to obtain historical travel data corresponding to each piece of the historical travel information.

17. The apparatus according to claim 16, wherein the computer program further causes the processor to:
  perform One-Hot encoding processing on a category-type feature in the historical travel data;
  perform abnormal-value processing on a numerical value-type feature in the historical travel data;
  perform normalization processing on the numerical value-type feature in the historical travel data on which the abnormal-value processing is performed.

18. The apparatus according to claim 16, wherein the computer program further causes the processor to:
  generate a travel feature vector corresponding to that piece of the historical travel data, according to user feature information and travel mode distribution information, travel environment feature information, feature information of a starting point and a destination point in that piece of the historical travel data;
  generate a label of the travel feature vector corresponding to that piece of the historical travel data, according to plan selection true value data in that piece of the historical travel data;
  take the travel feature vector corresponding to that piece of the historical travel data and its label as a piece of sample data.

19. A non-transitory computer readable storage medium having a computer program stored thereon, wherein the computer program, when being executed by a processor, implements a travel plan recommendation method comprising:

generating a travel feature vector, according to user persona information and travel mode distribution information of a user, current travel environment feature information, and feature information of a starting point and a destination point of a current travel;

inputting the travel feature vector into a travel plan classification model to calculate scores of candidate travel plans; and recommending a travel plan to the user, according to the scores of the candidate travel plans, wherein the travel plan classification model is obtained by:

acquiring multiple pieces of historical travel data;

performing feature pre-processing on the historical travel data, comprising:

performing One-Hot encoding processing on a category-type feature in the historical travel data;

performing abnormal-value processing on a numerical value-type feature in the historical travel data; and performing normalization processing on the numerical value-type feature in the historical travel data on which the abnormal-value processing is performed;

generating corresponding sample data according to each piece of the historical travel data that is pre-processed, to obtain a training set comprising sample data corresponding to the multiple pieces of historical travel data; and performing model training on a preset classification model using the training set, to obtain a travel plan classification model.

* * * * *